INVENTOR
FORREST W. NELSON
BY
Andrus & Starke
ATTORNEYS

United States Patent Office 3,625,732
Patented Dec. 7, 1971

3,625,732
METHOD OF PROTECTING SHARP CORNERS AND EDGES OF CARBON STEEL SUBSTRATES
Forrest W. Nelson, Pewaukee, Wis., assignor to A. O. Smith Corporation, Milwaukee, Wis.
Continuation-in-part of application Ser. No. 474,003, July 22, 1965. This application July 5, 1966, Ser. No. 563,947
Int. Cl. C23c 7/00; C23d 5/00
U.S. Cl. 117—43                    7 Claims

ABSTRACT OF THE DISCLOSURE

A method of protecting the sharp corners or edges of a carbon steel base from corrosion. A corrosion resistant metal is sprayed onto the edges of the carbon steel to be protected to provide a corrosion resistant coating on the edges. Subsequently a glass slip is applied to the article and over the porous metal coating. The article is then fired at an elevated temperature, above the melting point of the glass, to melt the glass and the molten glass flows to completely fill the voids in the porous metal coating.

---

Figure 1:
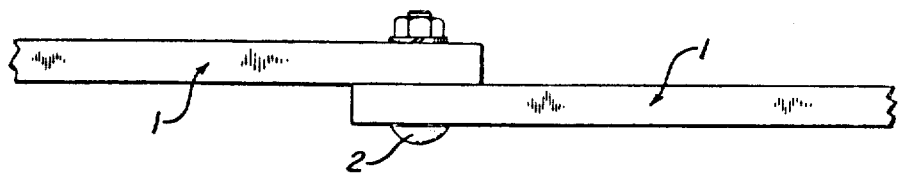

This application is a continuation-in-part of application Ser. No. 474,003, filed July 22, 1965, now abandoned and entitled Glass Coated Article and Method of Making the Same.

This invention relates to a glass coated article subjected in service to the influence of corrosive materials and to a method of making the article.

Storage vessels or silos are often fabricated from a series of curved metal plates which are bolted or otherwise secured together to form the generally cylindrical structure. To prevent corrosion, the metal panels are generally coated with a glass or vitreous enamel. To coat the panels, a conventional vitreous enamel slip, which is a water slurry containing a metal oxide frit and a mill addition, is sprayed onto the individual panels. After drying of the slip, the panels are fired at an elevated temperature, generally in the range of 1500 to 1600° F., to fuse the glass and provide a hard corrosion resistant coating on the outer surface of the steel panels.

While the glass or vitreous enamel itself is highly resistant to salt, acidic materials and the like, it is difficult to satisfactorily coat the edges of the thin panels due to the fact that edges are thin and the surface tension of the glass, during firing of the panel, tends to pull the glass away from the corners which border the thin edge. Thus, in practice, the edges of the panels may frequently have exposed areas of the metal or have areas which are thinly or inadequately coated with glass.

In a structure used for storing moderately corrosive materials such as silage or for storing salt, fertilizer or other highly corrosive materials, the edges are a focal point for intensified corrosion. Increasing the thickness of the glass coating along the edge portions is not a solution, for the thicker glass chips away more easily which again provides exposed areas for concentrated corrosion. In an attempt to overcome this problem it has also been proposed to grind the edges of the panel to provide rounded edges which can more readily be coated with the glass. While grinding the edges does aid in providing a more uniform glass coating, it does not completely eliminate the problem and the grinding increases the overall cost of the glass coating operation.

It has also been proposed to coat the carbon steel base metal with a corrosion-resistant metal, such as stainless steel, Inconel or the like, by a metal flame spray or plasma spray process. In a process such as this, the metal is melted, atomized and sprayed onto the carbon steel base and the atomized particles solidify on contact to provide a tightly adherent coating on the edges and sharp corners. While the use of a flame spray process does provide a uniform adherent coating of metal on the carbon steel base, the corrosion-resistant, flame-sprayed coating is porous by nature so that the corrosive material will penetrate through the sprayed coating and contact the carbon steel base. It has been found that if the carbon steel base, coated by a metal spray process with a corrosion-resistant metal, is subjected to a highly corrosive medium, the corrosive medium will penetrate the coating and attack the carbon steel base so that the base will be completely corroded away in a relatively short period of time, leaving a shell of the corrosion-resistant metal.

The present invention is directed to a new and novel approach for protecting a carbon steel base, and particularly sharp corners or edges of the steel base, against corrosion from highly corrosive materials. According to the invention, a corrosion-resistant metal wire or powder is sprayed by a flame spray or plasma arc spray process onto the edges and corners of the carbon steel article to be protected. During the spraying process the atomized particles of metal will freeze on contact with the base metal to provide a solidified coating on the edges and corners. Subsequently, a conventional glass slip is applied to the exposed surfaces of the article and a thin coating of the glass slip is also applied over the solidified, porous metal coating on the edges and corners. After the coating process, the article is fired at an elevated temperature generally in the range of 1400 to 1700° F. which softens or melts the glass, and the molten glass will flow to compeltely fill in any voids in the porous metal coating.

As an alternative method, rather than spraying a corrosion-resistant metal alone, a powdered mixture of a corrosion-resistant metal and either glass, a refractory material or mixtures of glass and a refractory material can be sprayed on the edges and corners of the article to be protected.

When spraying the metal powder alone, or when spraying the metal powder in combination with a refractory material, the under coating is relatively porous and it is necessary to apply a thin glass coating on the porous coating. However, if a mixture of powders is used, containing a substantial portion of glass powder, it is not necessary to overspray with glass because the glass in the undercoating will melt during firing and tend to fill in the voids between the corrosion-resistant metal particles. The resulting coating on the edges and corners of the base is tough, uniform and non-porous and is impermeable to highly corrosive materials such as acids, salt, fertilizer, silage and the like.

Other objects and advantages will appear in the course of the following description.

The drawings illustrate the best mode presently contemplated of carrying out the invention.

Figure 2:
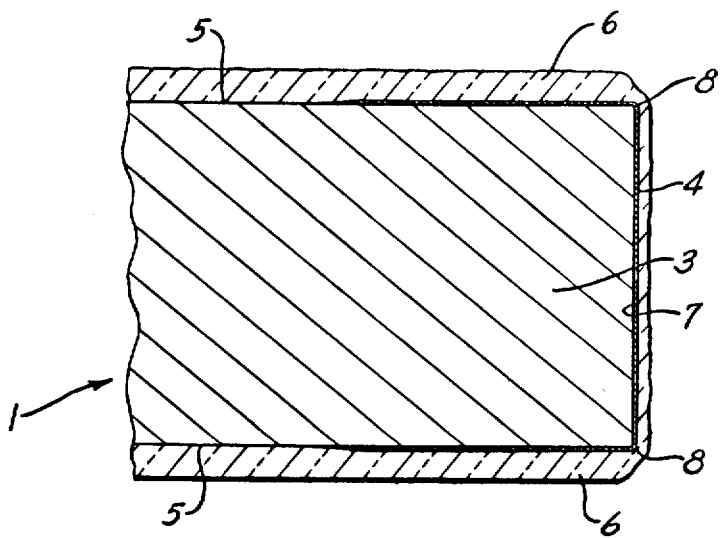

In the drawings:

FIG. 1 is a sectional view illustrating two glass coated panels connected together; and FIG. 2 is an enlarged fragmentary section showing the edge portion of a panel.

The drawings illustrate a pair of panels 1 which are connected together by a series of bolts 2 to provide a storage vessel or other tubular member. For example, the panels can be fabricated into a silo or the like, which is adapted to contain materials such as salt, fertilizer or other corrosive solid materials, or the panels can be fabricated into a tank or smokestack, to contain corrosive gases. Furthermore, structural members, such as angles or I-beams, or heat exchange plates which are to be used in corrosive applications can also be coated by the process of the invention.

As best shown in FIG. 2, each panel 1 comprises a carbon steel base 3 and a layer or undercoating 4 of a corrosion-resistant metal, or a mixture of a corrosion-resistant metal and either glass or a refractory material or a combination thereof, is applied to the edge portions of the base. Both the layer 4 and the exposed surfaces 5 of the base 3 are covered with a glass or vitreous enamel coating 6.

The layer 4 is applied by flame spraying or plasma arc spraying a corrosion-resistant metal wire or powder, or a mixture of a corrosion-resistant metal powder and glass powder and/or refractory powder on the end surfaces 7, as well as the edges 8, and along a portion of each face bordering the edges 8.

The corrosion resistant metal can be any conventional metal or alloy which is resistant to the particular corrosive material to which the panel is exposed in service and should have a melting point substantially above the temperature at which the glass or vitreous enamel 6 is subsequently fired, which is generally in the range of 1500 to 1800° F.

Specific examples of alloys which can be employed as the layer 4 are as follows:

| Alloy | Percent by weight | | | | | | | |
|---|---|---|---|---|---|---|---|---|
|  | Ni | Cr | Fe | Cu | Mn | Mo | W | Co |
| Monel | 67 |  | 2 | 30 | 1 |  |  |  |
| Hastelloy C | 53 | 17 | 6 |  |  | 19 | 5 |  |
| Nichrome I | 65 | 11 | 24 |  |  |  |  |  |
| Inconel | 80 | 15 | 5 |  |  |  |  |  |
| 18-8 Stainless | 8 | 18 | 74 |  |  |  |  |  |
| Cobalt base | 10 | 25 | 1 |  |  |  | 8 | 55 |

The glass or vitreous enamel is a conventional type commonly applied to articles adapted to contain corrosive materials and the glass frit can have the following general formation in weight percent:

|  | Percent |
|---|---|
| $SiO_2$ | 30–80 |
| $TiO_2$ | 0–10 |
| $B_2O_3$ | 5–12 |
| $Na_2O$ | 10–19 |
| $K_2O$ | 0–5 |
| $Al_2O_3$ | 0–10 |
| $Li_2O$ | 1–5 |
| $CaO$ | 0–3 |
| $BaO$ | 0–3 |
| $NiO_2$ | 0.3–1.0 |
| $MnO_2$ | 0.5–1.0 |
| $CoO$ | 0.4–0.7 |

Specific illustrations of glass frit formulations falling within the above general formulation are as follows in weight percent:

|  | Number | | |
|---|---|---|---|
|  | 1 | 2 | 3 |
| $SiO_2$ | 61 | 54 | 50 |
| $TiO_2$ | 9 | 12 | 10 |
| $B_2O_3$ | 4 | 7 | 9 |
| $Na_2O$ | 16 | 18 | 15 |
| $K_2O$ | 3 |  | 2 |
| $Al_2O_3$ |  | 4 | 6 |
| $Li_2O$ | 2 | 3 |  |
| $CaO$ | 2 |  | 4 |
| $BaO$ | 1 |  | 2 |
| $NiO_2$ | .6 | .5 | .7 |
| $MnO_2$ | .7 | .8 | .5 |
| $CoO$ | .7 | .7 | .8 |

The refractory material has a melting point above 2500° F. and is capable of being sprayed by a plasma arc or metal spray process. Any common refractory materials can be used such as the oxides, nitrides, silicides and borides of metals such as aluminum, titanium, zirconium, silicon, tantalum, chromium, nickel and the like. Specific examples of refractory materials which can be used are aluminum oxide, magnesium oxide, zirconium oxide, titanium oxide, chromium oxide, nickel oxide, and the like.

When using a mixture of glass and metal powder, the proportion of the glass in the mixture is not critical and can vary within wide limits. Generally, the glass powder can comprise up to 70% by weight of the mixture. If more than 70% by weight of glass is employed, the resulting coating will tend to be brittle and may have a tendency to chip away from sharp corner edges or thin edge surfaces.

When using a mixture of metal powder and a refractory powder, the refractory powder can comprise up to 60% by weight of the mixture.

When using a three component powder system, the following formulation in weight percent can be used:

|  | Percent |
|---|---|
| Glass frit powder | up to 70 |
| Refractory powder | up to 60 |
| Corrosion resistant metal powder | Balance |

The powders are mixed together by any conventional method to get uniform distribution of the powders in the mixture.

The mesh or particle size of the powders is not particularly critical and normally the powders will have a particle size smaller than 140 mesh and generally in the range of 140 to 325 mesh.

The powder is sprayed onto the carbon steel base by a conventional flame spray process using a gun such as that described in Pat. 2,707,691. In the flame spray process the powder is contained in a reservoir or hopper located atop the gun and the powder is fed by gravity into the gun where it is picked up in a gas stream by a jet or aspirating action and fed to the gun nozzle. As the powder is propelled from the nozzle, the atomized particles are melted in the gas flame and projected onto the surface being sprayed. Unlike a metal spray gun using wire which requires compressed air as a propellant and for atomization, the spray gun for powder utilizes only oxygen and acetylene or hydrogen.

The plasma arc process which can be employed to spray the powder on the base is a standard process as described in Scientific American, August 1957, "The Plasma Jet" and in Aviation Week, Oct. 13, 1958, "Giannini Plasmadyne Studies Plasma Jet Applications."

In practice, the sprayed coating has a thickness generally in the range of .001 to .008 inch and the thickness of the coating can be varied widely depending on the particular base metal to be coated, the specific application in which the base metal is used and the particular corrosive material which will be encountered.

In fabricating the corosion-resistant article, the carbon steel base 3 is initially grit or sand blasted or ground to remove foreign material as well as to provide some surface roughness which enhances the bond between the coating and the steel base. Following the cleaning, the powder is sprayed either by a metal spray or plasma arc spray process on the end surfaces 7 and edges 8 of the steel base as well as along a portion of each face 5 of the base bordering the edges. The powder is melted, atomized and projected onto the base in the form of discrete particles. The particles freeze on contact with the base to provide a tightly adherent coating.

Subsequently, the conventional glass or vitreous enamel coating 6 is applied to the exposed surfaces of the steel base 3 and a light or thin coating of the glass is applied over the solidified coating 4 on the edges 8 and end surfaces 7 of the base. The glass is usually applied as a slip by conventional spraying techniques, although the slip can also be applied by brushing, dipping or slushing. The slip is a water suspension of a glass frit and a mill addition and after application of the slip, the steel base is dried to evaporate the water.

In some cases it may be preferred to apply the glass as a dry powder or dust rather than in the form of a water suspension or slip.

A typical glass slip composition which can be used is as follows in parts by weight:

| | |
|---|---|
| Glass frit | 100 |
| Clay | 6.0 |
| $NaNO_2$ | 0.7 |
| Water | 45 |

The glass frit can be of the same composition as previously described.

In practice, the portion of the glass coating 6 overlying the exposed surfaces 5 of the steel base has a thickness generally in the range of 0.006 to 0.010 inch, while the portion of the glass coating overlying the coating 4 on the edges of the base has a thickness in the range of 0.001 to 0.005 inch. This lesser thickness on the edges can be achieved by the overspray when the glass slip is sprayed directly on the surfaces of the steel base.

Following the application of the glass coating 6, the article is fired at an elevated temperature generally in the range of 1400 to 1700° F. to fuse the glass. Firing at this temperature melts the glass but will not melt the corrosion-resistant metal, nor the refractory particles if they are used, and the molten glass will flow in and around the unmelted particles to completely fill the voids or spaces between the unmelted particles and provide a non-porous, adherent coating.

If the powdered mixture used to form undercoating 4 contains at least about 30% by weight of glass powder, it is not necessary to apply the thin glass coating 6 over the undercoating 4, because, during firing the glass in the undercoating will melt and flow to fill in any voids between the metal particles. However, when using metal powder alone, or when using a mixture of powders containing less than 30% by weight of glass powders to form the undercoating 4, a thin glass coating should be applied, by overspraying or the like, over the undercoating in order to provide a completely impervious coating on the edges and end surfaces of the panel.

The method of the invention is particularly adaptable to coating the sharp edges and end surfaces of thin panels and provides an impermeable, tough, non-brittle coating which is resistant to highly corrosive materials such as salt, fertilizer, stack gases, acids and the like. The coating method of the invention eliminates the inherent porosity of a sprayed metal coating and also overcomes the problem of brittleness of a glass coating on sharp edges and corners.

The following examples illustrate the method of preparing the corrosion-resistant article of the invention;

EXAMPLE 1

A 4" x 4" x .134" SAE 1010 carbon steel plate was initially grit-blasted to remove the grease and foreign material. A mixed powder consisting of 50% by weight of the glass frit composition #1 set forth in the above table and 50% by weight of Inconel powder, both powders having a mesh size of —140 to +270, were sprayed onto the plate by a conventional flame spray process using a Metco metalizing gun to provide a coating approximately .005 inch thick. Subsequently, a glass slip composed of 100 parts of the above-mentioned frit, 6.0 parts of clay, 0.4 part of Bentonite, 0.7 part of $NaNO_2$ and 45 parts of water was sprayed on the plate as a light coating having a thickness of approximately .001 inch, and the plate was then fired at a temperature of 1540° F. for 10 minutes. The coated plate was then immersed in 10% sulphuric acid at 150° F. for 72 hours and after this period the plate was removed and there was no visible evidence of corrosion of the base metal.

EXAMPLE 2

A 4" x 4" x .134" SAE 1010 carbon steel plate was ground with an $Al_2O_3$ abrasion wheel to remove grease and foreign material. A mixed powder consisting of 30% by wegiht of the glass frit composition #1 set forth in the above table and 70% by weight of Hastelloy C powder, both powders having a mesh size of —200 to +325, were sprayed by a conventional plasma arc process onto the edges and corners of the plate to provide a coating approximately .005 inch in thickness.

Subsequently, a glass slip containing the above-mentioned glass frit and a mill addition similar to that of Example 1 was sprayed directly on the exposed faces of the plate and oversprayed on the solidified glass-metal coating on the edges. This resulted in a glass coating 0.008 inch thick on the faces of the plate and 0.001 inch thick on the edges of the plate. The coated plate was then fired at a temperature of 1540° F. for 10 minutes to fuse the glass.

The plate was then immersed in 10% HCl at a temperature of 150° F. for a period of 72 hours, and after this period the plate was removed and there was no visible evidence of corrosion of the steel base metal.

EXAMPLE 3

A 4" x 4" x .134" SAE 1010 carbon steel plate was grit blasted to remove grease and foreign material. A mixed powder consisting of 30% by weight of the glass frit composition #2 set forth in the above table and 70% by weight of 316 stainless steel powder, both powders having a mesh size of —200 to +325, were sprayed by a conventional plasma arc process onto the edges and corners of the plate to provide a coating approximately .005 inch in thickness.

Subsequently, a glass slip containing the above-mentioned glass frit and a mill addition similar to that of Example No. 1 was sprayed directly on the exposed faces of the plate and oversprayed on the solidified glass-metal coating on the edges. This resulted in a glass coating 0.006 inch thick on the faces of the plate and 0.001 inch thick on the edges of the plate. The coated plate was then fired at a temperature of 154° F. for 10 minutes to fuse the glass.

The plate was then subjected to a salt spray at a temperature of 92° F. for a period of 750 hours, and after this period there was no visible evidence of corrosion of the steel base metal.

EXAMPLE 4

A 4" x 4" x .134" SAE 1010 carbon steel plate was initially sandblasted to remove the oxides and foreign material. Inconel powder having a mesh size of —200 to +325 was melted and sprayed onto the edge portions of the plate using a Metco metallizing gun to provide a coating of Inconel on the edge surfaces and edge corners approximately .005" thick.

A glass slip was prepared by adding 300 parts of a conventional corrosion-resistant glass frit, consisting of 50% A. O. Smith Corporation #3350 frit and 50% A. O. Smith Corporation #3618 frit, with 6 parts of clay, 0.4 part of bentonite, 0.3 part of borax, 10.0 parts silica and 47 parts of water. The glass slip was sprayed onto the panel and dried at 300° F. for a period of 1½ minutes. Subsequently, the plate was fired at a temperature of 1540° F. for 10 minutes. This resulted in a fused glass coating approximately .008 inch on the surface of the plates and a glass coating of .002 inch on the edge surfaces of the plate.

The glass coated plate was then immersed in 10% sulphuric acid at 150° F. for 72 hours. After this period, the plate was removed and there was no visible evidence of corrosion.

EXAMPLE 5

A steel plate similar to that of Example 4 was initially sandblasted and a coating of Hastelloy C was sprayed on two edge portions of the sheet to provide a coating on the two edge portions of the sheet approximately .005 inch thick.

A glass composition similar to that described in Example 4 was applied directly to the surfaces of the plate and oversprayed on all four edge portions of the plate, and the plate was then heated to a temperature of 300° F. for a period of 1½ minutes to dry the glass slip. Subsequently, the plate was fired at a temperature of 1540° F. for 10 minutes to fuse the glass.

The plate was then subjected to a salt-spray test and placed in a cabinet at 92° F. in contact with a salt water mist and maintained in the cabinet for a period of one month. At the end of this period the plate was removed from the test bath and examined for corrosion. The two edges of the plate which had been undercoated with the Hastelloy C and coated with the glass were not corroded, while the two edges coated only with glass overspray were badly corroded in this one-month period.

EXAMPLE 6

A pair of steel plates similar in size and composition to that of Example 4 were initially sandblasted and a coating of Inconel .005 inch thick was applied by a plasma spray process to both surfaces as well as all the edges of both plates.

A light glass dust coat was applied to the metal coated surfaces and edges of one of the plates, while the second plate was not coated with glass.

The glass coated plate was fired at a temperature of 1550° F. for a period of 10 minutes to fuse the glass.

Both plates were then immersed in a 10% $H_2SO_4$ bath at 150° F. for a period of 72 hours. After this period, the plates were removed from the acid bath and the glass coated plate showed no evidence of corrosion of the carbon steel base. In contrast to this, the second plate, coated only with the sprayed coating of Inconel, was completely corroded away, leaving a shell of the Inconel, thereby indicating that the sprayed coating of Inconel is, in itself, porous and will not protect the underlying carbon steel base from corrosive attack.

EXAMPLE 7

A steel plate similar in size and composition to that of Example 4 was sandblasted, and a powdered mixture consisting of 60% by weight of Inconel and 40% of $Al_2O_3$ was sprayed on the edge portions of the plate using a Metco metallizing gun to provide a coating approximately .005" thick.

A glass slip having a composition similar to that of Example 4 was sprayed over the surfaces and end portions of the plate, dried and subsequently fired at 1540° F. for 10 minutes.

The glass coated plate was immersed in 10% acetic acid for 72 hours and there was no visible evidence of corrosion after this period.

EXAMPLE 8

A steel plate similar in size and composition to that of Example 4 was sandblasted, and a powdered mixture consisting of 50% by weight of Hastelloy C, 40% glass and 10% $Zr_2O_3$ was sprayed by a plasma spray process on all surfaces of the plate. The solidified coating had a thickness of approximately .006".

The plate was then heated to a temperature of 1540° F. for 10 minutes to fire the glass in the coating.

The resulting coated plate was immersed in 10% acetic acid for 72 hours and there was no visible evidence of corrosion after this period.

Various modes of carrying out the invention are contemplated as being within the scope of the following claims particularly pointing out and distinctly claiming the subject matter which is regarded as the invention.

I claim:

1. A method of fabricating a carbon steel article to be exposed in service to a corrosive medium, said article having a first surface and a generally thin end surface joined to the first surface by a relatively sharp edge comprising the steps of melting a corrosion resistant metal, atomizing the melted metal, spraying the atomized metal onto the end surface and onto the edge of the article to form a relatively porous undercoating on said article, applying a coating of glass over the first surface of the article and over said undercoating and firing the coated article at a temperature above the softening temperature of the glass and below the melting point of the metal, said glass melting at the firing temperature to fill in the pores in said porous undercoating and provide an impermeable corrosion resistant coating.

2. The method of claim 1, in which the thickness of the glass coating on said end surface is less than the thickness of the glass coating on said first surface.

3. The method of claim 1, in which the thickness of the glass coating on the first surface is in the range of .006 to .010 inch and the thickness of the glass coating on said end surface is in the range of .001 to .005 inch.

4. The method of claim 1, and including mixing glass powder with said corrosion resistant metal powder, said glass comprising up to 70% by weight of the mixture.

5. The method of claim 1, in which the metal powder is sprayed on the article by flame spraying.

6. A method of fabricating a carbon steel article to be exposed in service to a corrosive medium, said article having a first surface and a generally thin end surface joined to said first surface by a relatively sharp edge, comprising the steps of mixing corrosion resistant metal powder and glass powder to provide a mixed powder and less than 70% by weight of the mixed powder, said glass powder comprising at least 30% by weight of the mixed powder, melting, atomizing and spraying the mixed powder onto the end surface and onto the edge of the carbon steel article to form a porous coating on said article, and heating the coated article to an elevated temperature above the softening temperature of the glass and below the melting point of the metal, the glass in said coating melting at said elevated temperature to fill in the spaces between the metal particles and provide an impermeable corrosion resistant coating.

7. The method of claim 6 and including the step of applying a coating of vitreous enamel over the glass-metal coating on said base prior to heating said base to said elevated temperature.

References Cited

UNITED STATES PATENTS

| | | | |
|---|---|---|---|
| 828,107 | 8/1906 | Gossweiler | 117—43 |
| 2,217,719 | 10/1940 | Williams | 117—71 M |
| 2,295,945 | 9/1942 | Fralish | 117—43 UX |
| 2,775,531 | 12/1956 | Montgomery et al. | 117—46 FS X |
| 2,964,420 | 12/1960 | Poorman et al. | 117—105 X |
| 2,966,430 | 12/1960 | Schrewelius | 117—46 FS X |
| 3,144,349 | 8/1964 | Swingler et al. | 117—6 |
| 3,190,769 | 6/1965 | Vasilos | 117—105.2 |
| 3,197,335 | 7/1965 | Leszynski | 117—70 C X |
| 3,254,970 | 6/1966 | Dittrich et al. | 117—105.2 X |

FOREIGN PATENTS

| | | | |
|---|---|---|---|
| 1,072,858 | 1/1960 | Germany | 117—43 |

ALFRED L. LEAVITT, Primary Examiner

J. R. BATTEN, JR., Assistant Examiner

U.S. Cl. X.R.

117—45, 70 A, 70 C, 71 M, 93.1 PF, 105, 105.2; 29—195